United States Patent [19]
Godfrey

[11] Patent Number: 6,099,585
[45] Date of Patent: Aug. 8, 2000

[54] SYSTEM AND METHOD FOR STREAMLINED EXECUTION OF INSTRUCTIONS

[75] Inventor: Gary M. Godfrey, Austin, Tex.

[73] Assignee: Advanced Micro Devices, Inc., Sunnyvale, Calif.

[21] Appl. No.: 09/075,507

[22] Filed: May 8, 1998

[51] Int. Cl.⁷ ...................................................... G06F 9/45
[52] U.S. Cl. .................................... 717/9; 717/5; 712/32; 712/37; 712/208
[58] Field of Search ...................................... 395/701–703, 395/705–709; 712/1, 32–37, 208–214, 221, 222, 233, 248; 713/1, 100; 717/1, 2, 3, 5, 6, 7, 8, 9

[56] References Cited

U.S. PATENT DOCUMENTS

| | | |
|---|---|---|
| 5,142,632 | 8/1992 | Tychon et al. . |
| 5,499,350 | 3/1996 | Uchida et al. ........................... 712/220 |
| 5,574,913 | 11/1996 | Ohtsu ...................................... 712/220 |
| 5,574,915 | 11/1996 | Lemon et al. ........................... 712/220 |
| 5,586,337 | 12/1996 | Kusakabe ................................. 712/32 |
| 5,615,127 | 3/1997 | Beatty et al. ....................... 395/500.08 |
| 5,666,537 | 9/1997 | Debnath et al. ........................ 713/322 |
| 5,752,073 | 5/1998 | Gray, III et al. .......................... 712/35 |
| 5,768,553 | 6/1998 | Tran ....................................... 712/208 |
| 5,778,250 | 7/1998 | Dye ........................................... 712/32 |
| 5,848,289 | 12/1998 | Studor et al. ............................. 712/32 |

OTHER PUBLICATIONS

Kole, "Optimizing Compiler Exploits DSP features" Hgh performance Systems, 1990, pp40–45.

Shear, "HLL compilers and DSP runtime libraries make DSP–system programming easy" EDN, 1988, pp 69–76.

*Primary Examiner*—Kakali Chaki
*Attorney, Agent, or Firm*—Conley, Rose & Tayon P.C.; Jeffrey C. Hood; Louis H. Iselin

[57] ABSTRACT

A system and method for the streamlined execution of complex or repeating instructions. The method comprises creating a specialized instruction unit for executing a group of operations and then executing the group as they appear in an instruction stream. The system includes a programmable specialized instruction unit for executing the group of instructions as they appear in an instruction stream. The method comprises receiving a plurality of instructions, examining the plurality of instructions, identifying a subset of the plurality of instructions, creating a specialized instruction unit which is operable to execute the subset, and executing the subset in the special instruction unit upon an occurrence of the subset. Examining the plurality of instructions may occur at such times as compiling a computer program, performing an initialization procedure, or fetching or decoding instructions before execution. Identifying the subset includes selecting a series of instructions which require hardware external to the processor. Creating a specialized instruction unit includes programming a programmable logic or device. The method may also include identifying a second subset of the plurality of instructions, preparing a second specialized instruction unit which is operable to execute the second subset, and executing the second subset in the second specialized instruction unit. The specialized instruction unit is preferably embodied in a computer system comprising a decode unit, a plurality of registers coupled to the decode unit, a load/store unit coupled to the decode unit, a branch execute unit coupled to the decode unit, one or more arithmetic/logic units coupled to the decode unit, one or more specialized instruction units coupled to the decide unit, and a writeback unit coupled to the plurality of registers.

23 Claims, 6 Drawing Sheets

SYSTEM AND METHOD FOR STREAMLINED EXECUTION OF INSTRUCTIONS

BACKGROUND OF THE INVENTION

1. Field of the Invention

This invention relates to integrated circuits in general and, more particularly, to a system and method for programming and using a specialized instruction unit for the streamlined execution of selected instructions.

2. Description of Related Art

The concept of executing instructions is generally well known. A typical processor decodes an instruction stream, stores data and instructions as necessary in registers, controls branching and load/store operations, and executes instructions in a logic unit. In many instances, a complex operation requires a large number of processor cycles. Alternatively, when a complex operation requires hardware outside the processor in order to execute all or part of the complex operation, input/output exchanges add overhead to the processing and often cause delays in executing the complex operation. In other cases, a series of operations are found to occur in the instruction stream multiple times.

A system and method is therefore needed which executes the complex operation or the series of operations in an efficient manner. Even better would be a general way of handling both cases as they might arise in the instruction stream.

SUMMARY OF THE INVENTION

The present invention comprises a system and method for the streamlined execution of complex, external, or repeating instructions. The method comprises dynamically creating a specialized instruction unit for executing a group of operations and then executing the group of operations as they appear in an instruction stream. The system includes a programmable or configurable specialized instruction unit, which is dynamically programmable or configurable for executing group of operations as they appear in an instruction stream.

The method for executing instructions comprises receiving a plurality of instructions, and examining the plurality of instructions. The method then identifies a subset of the plurality of instructions for which it is desirable to create a specialized instruction unit. The method then creates a specialized instruction unit, which is operable to execute the subset, and executes the subset in the special instruction unit upon an occurrence of the subset. Examining the plurality of instructions occurs during instruction execution, at such times as performing an initialization procedure, or when fetching or decoding instructions before execution. Identifying the subset may include selecting a repeating subset of instructions or selecting a series of instructions which require hardware external to the processor. Creating a specialized instruction unit may include programming a field programmable logic array or other programmable logic or device.

In one embodiment the instructions are examined during compile time. When an instruction sequence is identified for which a specialized instruction unit is desired, special commands are inserted into the machine code being created. During execution, these special commands are detected, and the special commands operate to configure a specialized instruction unit for execution of one or more upcoming sequences of instructions.

Additional features of the method may include identifying a plurality of different subsets of the plurality of instructions, preparing a plurality of specialized instruction units which is operable to execute the various subsets of the plurality of instructions, and executing the subsets of the plurality of instructions in the respective specialized instruction units.

The present invention is preferably embodied in a computer system comprising a decode unit operable to decode instructions, a plurality of registers coupled to the decode unit, a load/store unit coupled to the decode unit a branch execute unit coupled to the decode unit, one or more arithmetic/logic units coupled to the decode unit, one or more specialized instruction units coupled to the decide unit, and a writeback unit coupled to the plurality of registers. The plurality of registers is operable to store one or more of the group consisting of: the instructions, memory addresses, values, and results. The load/store unit is operable to load the values from memory locations and to store the values to the memory locations. The branch execute unit is operable to execute branch instructions. The one or more arithmetic/logic units are operable to execute arithmetic and logic instructions. The one or more specialized instruction units are programmable to execute a select sequence of a plurality of instructions. The writeback unit is operable to update the plurality of registers responsive to execution results from at least the one or more arithmetic/logic units.

In one embodiment the computer system further comprises one or more floating point units coupled to the decode unit. The one or more floating point units are operable to execute floating point instructions. In another embodiment, the one or more specialized instruction units execute the select sequence of a plurality of instructions at a faster rate than at least the one or more arithmetic/logic units. In still another embodiment, the select sequence of the plurality of instructions executable by the one or more specialized instruction units is selected from the group consisting of: only integer instructions; only floating point instructions; only multimedia instructions; and a combination of the integer instructions and the floating point instructions; a mixture of the floating point instructions and the multimedia instructions; and instructions external to the computer processor.

BRIEF DESCRIPTION OF THE DRAWINGS

A better understanding of the present invention can be obtained when the following detailed description of the preferred embodiment is considered in conjunction with the following drawings, in which.

Figure 1:
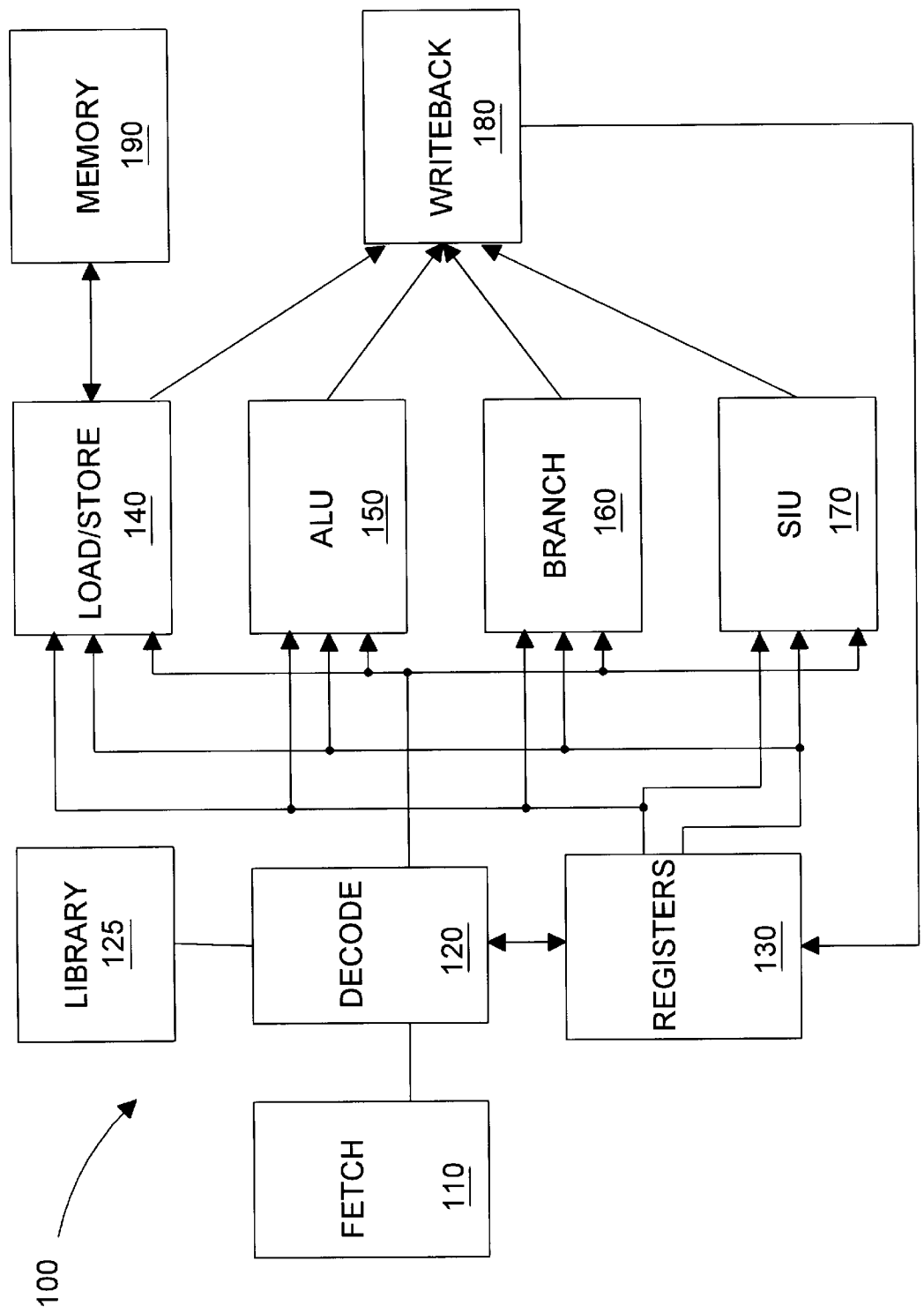
FIG. 1 illustrates a block diagram of an embodiment of a computer system according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF PREFERRED EMBODIMENTS

The present invention comprises a system and method for the streamlined execution of complex or repeating instructions. The use of a letter as part of a number designating a component of a system described in this document will be to show multiple instances of equivalent or similar components. All figures will use a uniform numbering system with identical or similar parts across the figures being given identical numbers.

FIG. 1—Computer System including a Specialized Instruction Unit

Turning now to the drawings, FIG. 1 shows an embodiment of a block diagram of a computer system 100. The computer system 100 comprises a fetch unit 110 for fetching instructions in series with a decode unit 120 for decoding instructions. A plurality of registers 130 and a library 125 are coupled to the decode unit 120. The plurality of registers 130 is operable to store one or more of instructions, memory addresses, values, and results. A load/store unit 140 is coupled to the decode unit 120 and memory 190. The load/store unit 140 is operable to load the values from memory 190. The load/store unit 140 is further operable to store the values to the memory 190. A branch execute unit 160 is also coupled to the decode unit 120. The branch execute unit is operable to execute branch instructions. One or more arithmetic/logic units (ALU) 150 are also coupled to the decode unit 120. The ALUs 150 are operable to execute arithmetic and logic instructions.

One or more specialized instruction units (SIUs) 170 of the present invention are also coupled to the decode unit 120. Each of the SIUs 170 is programmable or configurable to execute a select sequence of a plurality of instructions. A writeback unit 180 is coupled to the plurality of registers 130, the load store unit 140, the ALU 150, the branch unit 160, and the SIU 170. The writeback unit 180 is operable to update the plurality of registers 130 responsive to execution results from at least the ALU 150. As shown, the decode unit 120 and the registers 130 are also interconnected with the load store unit 140, the ALU 150, the branch unit 160, and the SIU 170, with three inputs each to the load store unit 140, the ALU 150, the branch unit 160, and the SIU 170. The library preferably includes various configurations for the SIUs 170. In one embodiment, the decode unit 120 or other device is operable to select a configuration from the library 125 to configure the SIUs 170.

The computer system 100 may further include one or more floating point units (FPUs) (not shown) coupled to the decode unit 120. The FPUs are operable to execute floating point instructions. In another embodiment, the SIUs 170 execute the select sequence of a plurality of instructions at a faster rate than the ALUs 150. In another embodiment, the select sequence of a plurality of instructions executable by the SIUs 170 is selected from integer instructions, floating point instructions, multimedia instructions, instructions external to the computer processor or a combination of the above. The ALU 150 will generally be described below as a general processing unit 150. It is noted that a FPU or other processing unit may also be used as general processing unit 150. FIG. 1 illustrates one embodiment of a CPU architecture, and it is noted that various CPU or processor architectures may be used with the present invention.

In various embodiments, the select sequence of the plurality of instructions includes one or more external instructions, or repetitive instructions. The one or more external instructions may only be executable with latency, or cause an increase in execution time. That is, external instructions may require a longer time for execution when compared to the average or typical time for execution of other, non-external, instructions. The increase in execution time may be the result of delays from an external call. In various embodiments, the programmable logic elements are selected from any type of programmable logic, including programmable array logics (PALs), programmable logic devices (PLDs), field programmable gate arrays (FPGAs), dynamically reconfigurable logics (DRL), and dynamically reconfigurable hardware (DRHW).

Figure 2:
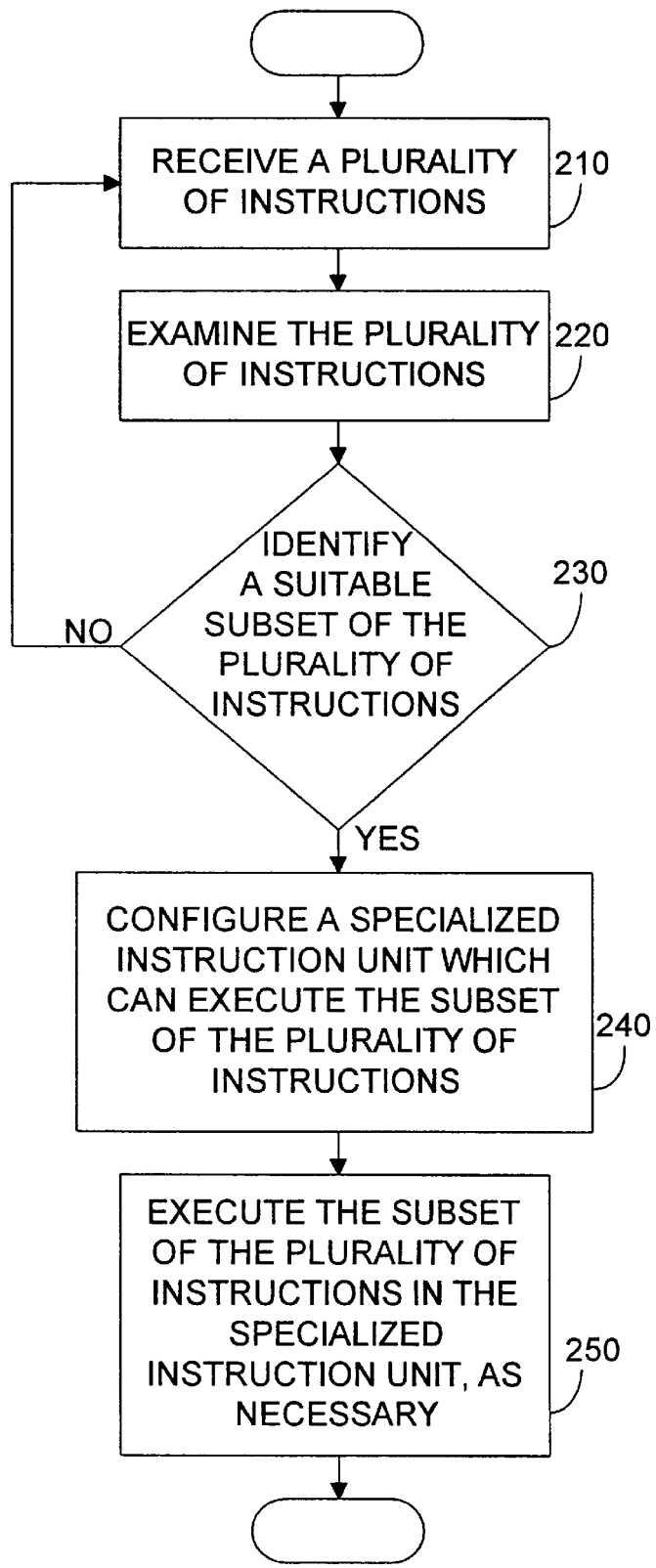
FIG. 2 illustrates a flowchart of an embodiment of a method for executing a subset of a plurality of instructions according to the present invention.

FIG. 2—Method of Executing a Subset of Instructions

FIG. 2 is a flowchart illustrating an embodiment of a method for executing a selected subset of a plurality of instructions. The method comprises first receiving a plurality of instructions 210. For example, the fetch unit 110 receives a plurality of instructions. In 220, the method examines the plurality of instructions and in 230, the method identifies a suitable subset of the plurality of instructions. In the embodiment of FIG. 1, the decode unit 120 operates to examine 220 and identify 230 the suitable subset of the plurality of instructions. If no suitable subset of the plurality of instructions is found, the method returns to receiving a plurality of instructions 210. A suitable subset may include a subset repeating two or more times in the plurality of instructions, a complex set of instructions, or external instructions which require a call external to the processor 100. The method continues creating, or configuring, a specialized instruction unit that is operable to execute the subset of the plurality of instructions 240. Creating 240 may comprise programming a plurality of programmable logic elements to execute the subset of the plurality of instructions. Creating 240 preferably occurs in response to identifying 230. After creating 240, the method executes the subset of the plurality of instructions, or a special op-code, in the specialized instruction unit 250. Executing 250 occurs each time that the repeating subset of the plurality of instructions is ready for execution. Ready for execution may include being a next instruction or group of instructions in a processor pipeline.

In one embodiment examining 220 occurs during a compiling of a computer program by a compiler or interpreter. In another embodiment, examining 220 occurs during an initialization procedure. Contemplated initialization procedures include power-on of a computer system 100 or processor, or the starting of a computer program, although other initialization procedures may also be used as desired. In another embodiment, a designer may create an instruction sequence by hand. In yet another embodiment, the subset of the plurality of instructions includes one or more external instructions only executable with latency or by hardware external to the processor. In still another embodiment the plurality of programmable logic elements are selected from the programmable array logics (PALs), programmable logic devices (PLDs), field programmable gate arrays (FPGAs), dynamically reconfigurable logics (DRL), and dynamically reconfigurable hardware (DRHW). Although the method is shown in flowchart form, it is noted that portions of FIG. 2 may occur concurrently or in different orders.

It is contemplated that configuring the SIU 170 in 240 to execute the subset of the plurality of instructions in the SIU 170 in 250 comprises the compiler, for example, replacing the subset of the plurality of instructions to be executed in the SIU 170 with the special op-code. In 240, the SIU 170 is configured to execute the op-code to obtain the desired result. The op-code is then executed in the SIU in 250, replacing the subset of the plurality of instructions. For each configuration of the SIU 170, a different op-code may be generated, or alternatively, the same op-code could be used, with different passed parameters.

Figure 3:
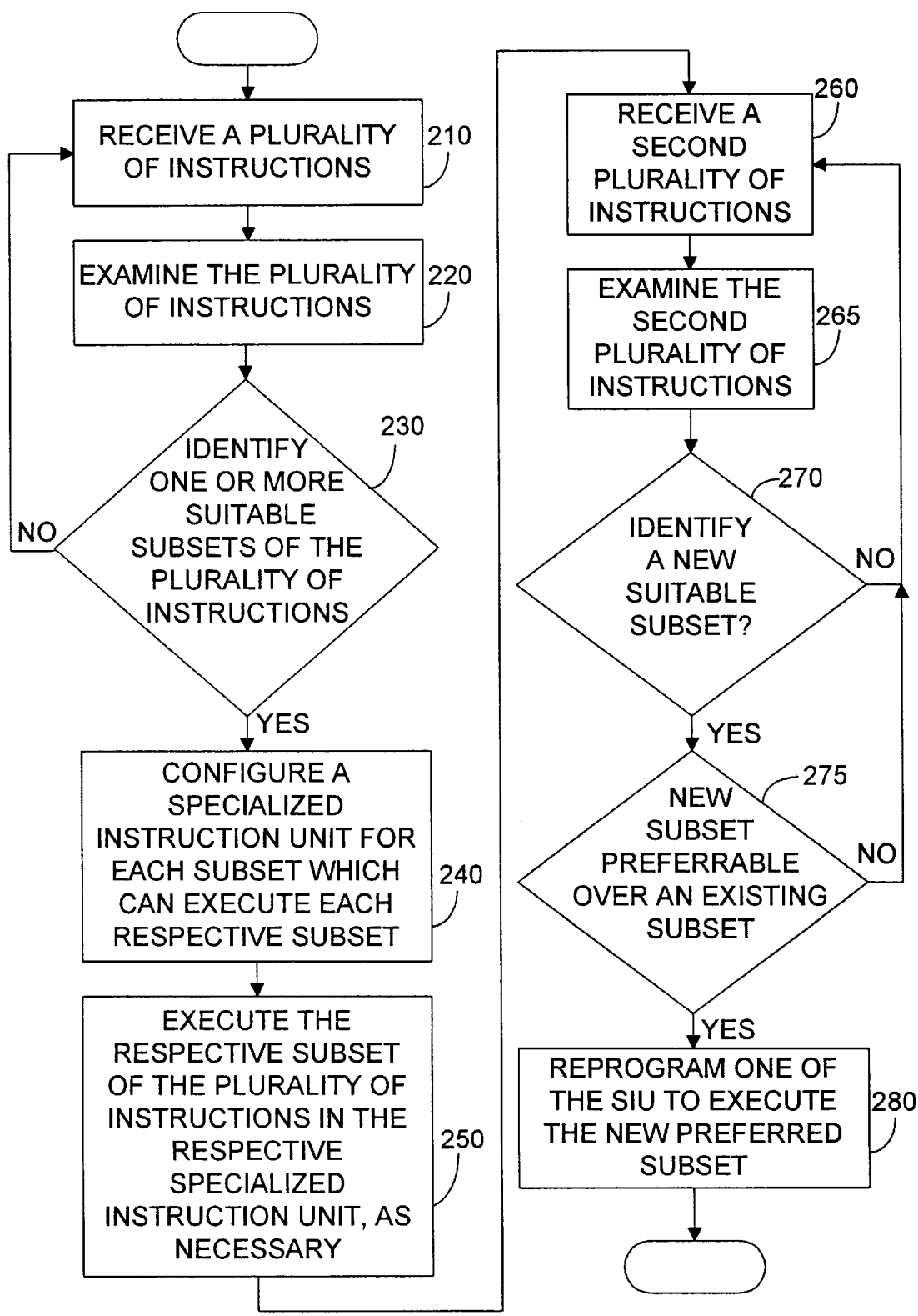
FIG. 3 illustrates a flowchart of an embodiment of a method for executing one or more subsets of a plurality of instructions according to the present invention.

FIG. 3—Method of Executing Multiple Subsets of Instructions

The present invention is further detailed in FIG. 3 with a flowchart of an embodiment of a method for executing one or more subsets of a plurality of instructions. The method comprises the following: Receiving a plurality of instructions 210, examining the plurality of instructions 220; and identifying a suitable subset of the plurality of instructions 230. If no suitable subset of the plurality of instructions is found, the method returns to receiving a plurality of instructions 210. A suitable subset may include a subset repeating two or more times in the plurality of instructions. The method next creates a specialized instruction unit, which is operable to execute the subset of the plurality of instructions 240. Creating 240 may comprise programming a plurality of programmable logic elements to execute the subset of the plurality of instructions.

In 250, the method executes the subset of the plurality of instructions in the specialized instruction unit. Executing 250 occurs each time that the repeating subset of the plurality of instructions is ready for execution. Ready for execution includes being a next instruction or group of instructions in a processor pipeline. The method then receives a second plurality of instructions 255; examines the second plurality of instructions 260; and identifies a new suitable subset of the plurality of instructions 265. If no new suitable subset of the plurality of instructions is found, the method returns to receiving a second plurality of instructions 255. The method decides if the new subset is preferable over the existing subset in 270. If the new suitable subset of the plurality of instructions is not preferable over the existing subset, the method returns to receiving a second plurality of instructions in 255. If the new suitable subset of the plurality of instructions is not preferable over the existing subset, the method reprograms one of the SIUs 170 to execute the new preferred subset of the plurality of instructions in 275.

In one embodiment, the second subset occurs after a first occurrence of the first subset. Additional subsets may also be identified. The multiple subset are compared and ranked so that a preferred subset is chosen. If necessary, one of the specialized instruction units 170 is reprogrammed to execute the preferred subset.

In one embodiment examining 220 and/or 260 occur during a compiling of a computer program by a compiler or interpreter. In another embodiment examining 220 and or 260 occur during an initialization procedure. Contemplated initialization procedures include power-on of a computer system 100 or processor, or the starting of a computer program, although other initialization procedures may also be used as desired. In another embodiment, the subset of the plurality of instructions includes one or more external instructions only executable with latency or by hardware external to the processor. In still another embodiment, the plurality of programmable logic elements are selected from the programmable array logics (PALs), programmable logic devices (PLDs), field programmable gate arrays (FPGAs), dynamically reconfigurable logics (DRL), and dynamically reconfigurable hardware (DRHW).

Criteria for selecting one subset over another include preferring the subset which executes slowest, the subset which occurs most frequently, and/or the subset which has the longest latency for execution. In various embodiments, the examining 220 and/or 260 may occur at different times and be performed by the same or different devices, systems, or methods. Although the method is shown in flowchart form, it is noted that portions of FIG. 3 may occur concurrently or in different orders.

Figure 4A:
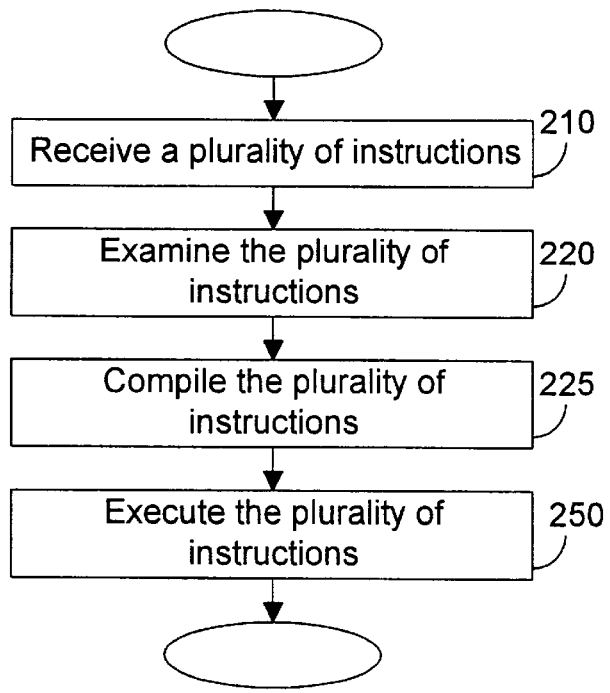
FIG. 4A illustrates a flowchart of an embodiment of the method of FIG. 2 for executing a subset of a plurality of instructions according to the present invention.

FIG. 4A—Method for Compiling a Program

Turning to FIG. 4A, a method for compiling program instructions is illustrated in flowchart form. The method comprises first receiving a plurality of instructions 210, either program instructions or machine code instructions as desired. Next, the method examines the plurality of instructions 220 after receiving the instructions. If the method is examining program instructions, then the program instructions are compiled into machine instructions 225. Details regarding compiling 225 are given below with respect to FIG. 4B. In the embodiment of FIG. 1, the method is performed in a processing unit including a general processing core 150 and a specialized instruction unit 170. The specialized instruction unit 170 preferably executes the plurality of instructions of interest 250 faster than the general processing core 150 would execute the plurality of instructions of interest. Additional details regarding executing 250 are given below with respect to FIG. 4C. It is noted that FIG. 4A parallels FIG. 2 in many aspects of describing different embodiments of the present invention. Although FIG. 4A has been shown as a flowchart, it is also noted that portions of the method of FIG. 4A may occur concurrently or in different orders.

FIG. 4B—Method

Figure 4B:
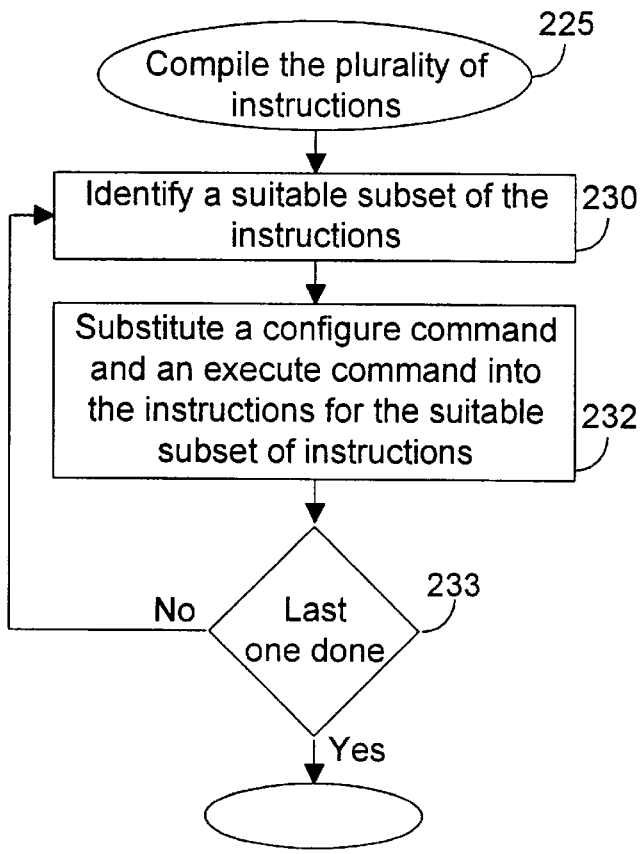
FIG. 4B illustrates a flowchart of an embodiment of a method of compiling a computer program according to the present invention.

FIG. 4B provides additional details concerning compiling instructions 225 in the method of FIG. 4A. First, the compiling 225 comprises identifying a subset of at least one of the plurality of program instructions or the plurality of machine instructions 230. Any suitable or desired subset of the plurality of instructions may be chosen or identified in 230. In other words, the identifying 230 may examine source code instructions or machine code instructions, or both. Next, the method inserts a configure command into the machine instructions in response to identifying a subset of the instructions in 225. The command is operable to configure a specialized instruction unit 170 to execute the subset of the plurality of instructions in 250. For each subsequent occurrence of the subset of the plurality of the instructions, the method inserts an execution command into the machine instructions 232. The execution command is inserted one or more times after the configure command has been inserted. The execution command replaces each subsequent instance of the subset of the plurality of instructions and is operable to implement the subset of the plurality of instructions, preferably in the specialized instruction unit 170.

The method continues identifying either the current subset of the plurality of instructions, or a new subset of the plurality of instructions until all suitable subsets have been identified in 230 and had configure and/or execute commands substituted for the suitable subsets in 232. For example, for each subsequent instance of the identified suitable subset of the plurality of instructions, the method inserts the execution command 232. The method may include identifying a new subset of the plurality of program instructions or the plurality of machine instructions in 230. Next the method inserts a new configure command into the instructions 232 in response to identifying a new subset in 230. The new configure command is operable to re-configure the specialized instruction unit 170 to execute the new subset of the plurality of instructions in 250. The method then inserts a new execution command into the machine instructions 232 after the new configure command. The new execution command replaces each subsequent instance of the new subset of the plurality of instructions and operates to implement the new subset of the plurality of instructions.

In various embodiments, the method of FIG. 4B includes identifying only a subset of the plurality of program instructions in 230. The method of FIG. 4B may also include identifying only a subset of the plurality of machine instructions in 230. Although the method is shown in flowchart form, it is noted that portions of FIG. 4B may occur concurrently or in different orders.

Figure 4C:
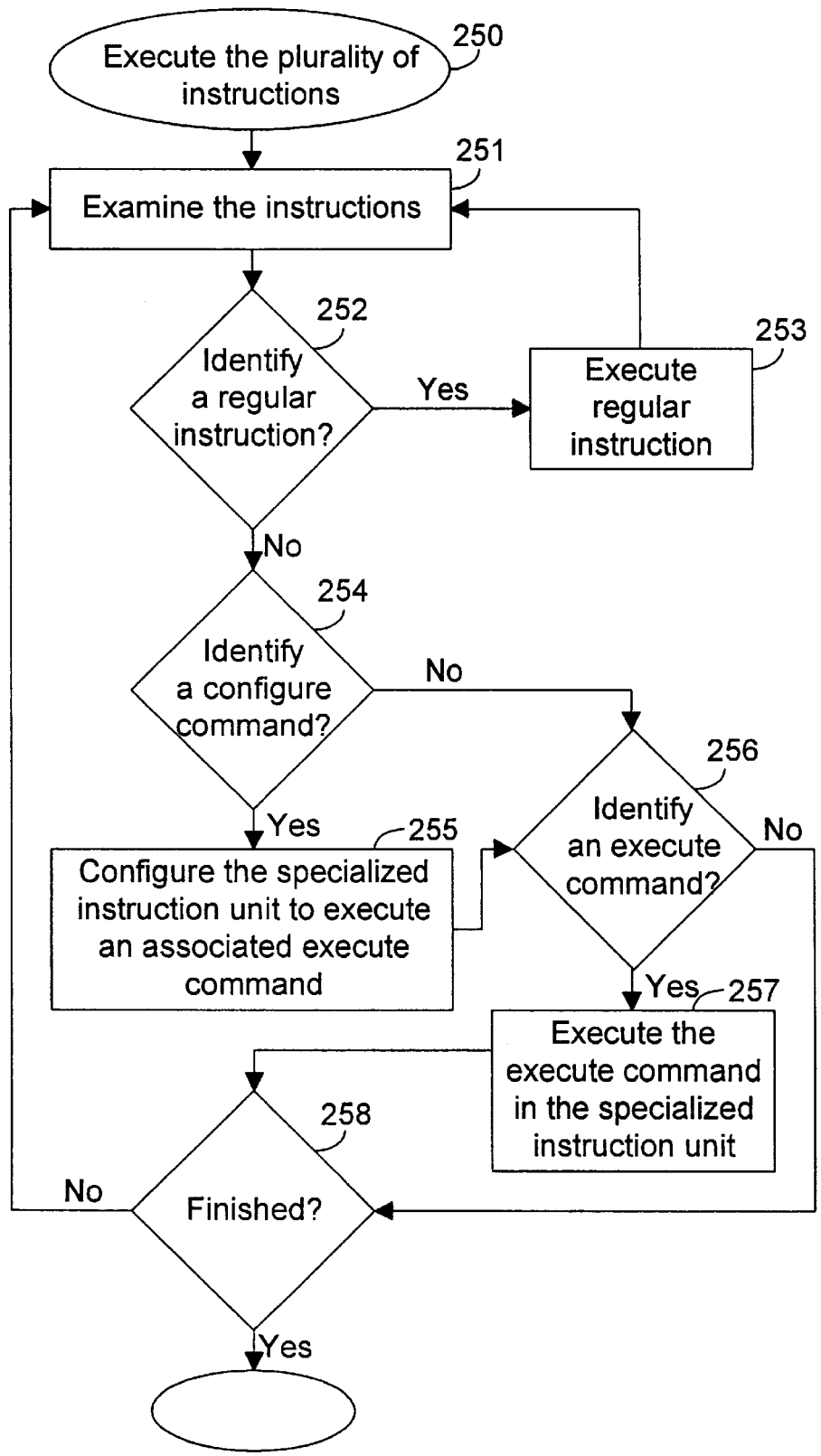
FIG. 4C illustrates a flowchart of an embodiment of a method of executing a subset of a plurality of instructions complied with the method of FIG. 4B, according to the present invention.

FIG. 4C—Method of Executing Instructions

FIG. 4C provides additional details concerning executing instructions 250 in the method of FIG. 4A. Executing 250 comprises a processor executing machine instructions in a general sense. The processor preferably includes a general processing core 150 and a specialized instruction unit 170. Specifically, executing the machine instructions 250 comprises first examining the machine instructions 251. The examined instructions are identified and classified in 252, 254, 256, and/or 258. If a regular instruction is identified, that is, an instruction to be executed in the general processing core 150, the regular instruction is executed in 253, preferably in the general processing core 150, and the method continues to examine the next instructions 251.

If a configure command is identified in the machine instructions in 254, then the method configures the specialized instruction unit 170 to execute the execute command 255 in response to identifying the configure command in 254. The next instruction is checked to identify the execute command in 256. If the execute command is identified in the machine instructions in 256 in response to configuring the SIU 170 to execute the execute command in 255, then the SIU 170 executes the execute command to implement the subset of the plurality of instructions in 257 in response to identifying the execute command in the machine instructions in 256. The method continues until the instructions are finished in 258, otherwise the method continues in 251.

In one embodiment, configuring in 255 comprises programming a programmable logic device to execute the execute command to implement the subset of the plurality of instructions. In another embodiment, the method of FIG. 4C continues with the identifying of a new configure command in the instructions, after a previous configure command has been identified in the instructions. The method continues in parallel with the above described 254–257, this time with respect to the new configure command and a new execute command. The method includes configuring the specialized instruction unit 170 to execute the new execute command in response to identifying the new configure command. The method then identifies the new execute command in the machine instructions in response to configuring the specialized instruction unit 170 to execute the new execute command. The method executes the new execute command to implement the new subset of the plurality of instructions in response to identifying the new execute command in the instructions. In one embodiment, the system of the present invention shown in FIG. 1 includes two or more SIUs 170. The new configure command and the new execute command may reprogram the first SIU 170 to overwrite the programming to execute the first execute command, or the new configure command may configure a second SIU 170 to execute the new execute command, as desired. Additional SIUs 170 with various configurations are also contemplated.

Figure 5:
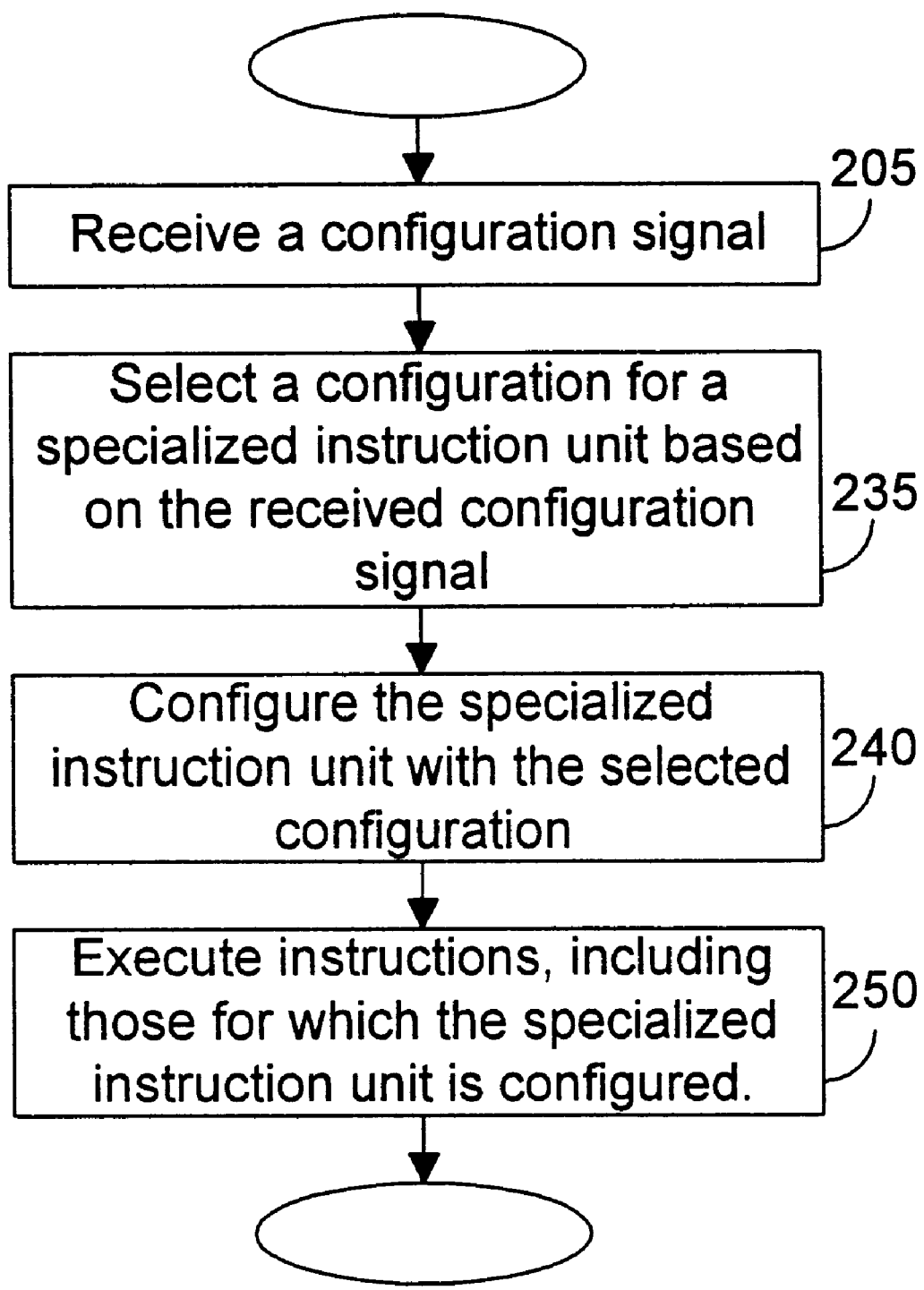
FIG. 5 illustrates a flowchart of another embodiment of the method of FIG. 2 for executing a subset of a plurality of instructions according to the present invention.

FIG. 5—Method of Configuring the Specialized Instruction Unit

One embodiment of the present invention is detailed as a flowchart in FIG. 5. A method for configuring the specialized instruction unit 170 comprises the following. First, receiving a configuration signal to configure the specialized instruction unit to execute one or more instructions 205. The instructions are preferable only a portion of a larger group of instructions. The configuration signal may be issued upon a power-on condition or at other times during the operation of a device or system according to the present invention. The method next selects a configuration for the specialized instruction unit in response to receiving the configuration signal to configure the specialized instruction unit to execute one or more instructions 235. Libraries of different configurations are contemplated, stored in either hardware, firmware, and/or software, such as library 125 shown in FIG. 1. The method next configures the specialized instruction unit to execute the one or more instructions 240. In one embodiment configuring 240 comprises programming a programmable logic device to execute the one ore more instructions. Configuring 240 is performed in response to selecting in 235. After the specialized instruction unit is configured 240, according to the method, the specialized instruction unit executes the one or more instructions 250. Although the method is shown in flowchart form, it is noted that portions of FIG. 5 may occur concurrently or in different order than discussed.

Therefore, the present invention comprises by a system and method for the streamlined execution of complex or repeating instructions. Although the system and method of the present invention have been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for compiling program instructions, the method comprising:

receiving a plurality of program instructions;

examining the plurality of program instructions after said receiving;

compiling the plurality of program instructions into machine instructions, wherein said compiling comprises:

identifying a subset of at least one of the plurality of program instructions or the plurality of machine instructions;

inserting a configure command into the machine instructions in response to said identifying, wherein said configure command is operable to configure a specialized instruction unit to execute the subset of the plurality of instructions; and inserting an execution command into the machine instructions after said configure command, wherein the execution command replaces the subset of the plurality of instructions, wherein the execution command is operable to implement the subset of the plurality of instructions.

2. The method of claim 1, wherein said identifying comprises identifying only a subset of the plurality of program instructions.

3. The method of claim 1, wherein said identifying comprises identifying only a subset of the plurality of machine instructions.

4. The method of claim 1, further comprising:
a processor executing the machine instructions, wherein the processor includes a general processing core and a specialized instruction unit, wherein said processor executing the machine instructions comprises:
examining the machine instructions;
identifying the configure command in the machine instructions;
configuring the specialized instruction unit to execute the execute command in response to said identifying a configure command;
identifying the execute command in the machine instructions in response to said configuring the specialized instruction unit to execute the execute command; and
executing the execute command to implement the subset of the plurality of instructions in response to said identifying the execute command in the machine instructions.

5. The method of claim 4, wherein said configuring comprises programming a programmable logic device to execute the execute command to implement the subset of the plurality of instructions.

6. The method of claim 1, wherein the subset occurs two or more times in the plurality of instructions.

7. The method of claim 1, wherein the subset is executable by hardware external to a processor, wherein the hardware executes the subset at a slower rate than the processor executes an equivalent number of instructions.

8. The method of claim 1, wherein the method is performed in a processing unit, wherein the processing unit includes a general processing core and the specialized instruction unit;
wherein the specialized instruction unit executes the subset of the plurality of instructions faster than said general processing core would execute the subset of the plurality of instructions.

9. The method of claim 1, further comprising:
identifying a new subset of said at least one of the plurality of program instructions or the plurality of machine instructions;
inserting a new configure command into the machine instructions in response to said identifying a new subset, wherein said command is operable to re-configure the specialized instruction unit to execute the new subset of the plurality of instructions; and
inserting a new execution command into the machine instructions after said new configure command, wherein the new execution command replaces the new subset of the plurality of instructions, wherein the new execution command is operable to implement the new subset of the plurality of instructions.

10. The method of claim 9, further comprising:
a processor executing the machine instructions, wherein the processor includes a general processing core and a specialized instruction unit, wherein said processor executing the machine instructions comprises:
examining the machine instructions;
identifying the configure command in the machine instructions;
configuring the specialized instruction unit to execute the execute command in response to said identifying the configure command;
identifying the execute command in the machine instructions in response to said configuring the specialized instruction unit to execute the execute command;
executing the execute command to implement the subset of the plurality of instructions in response to said identifying the execute command in the machine instructions;
identifying the new configure command in the machine instructions;
configuring the specialized instruction unit to execute the new execute command in response to said identifying the new configure command;
identifying the new execute command in the machine instructions in response to said configuring the specialized instruction unit to execute the new execute command; and
executing the new execute command to implement the new subset of the plurality of instructions in response to said identifying the new execute command in the machine instructions.

11. A method for executing instructions, the method comprising:
receiving a plurality of instructions;
examining the plurality of instructions after said receiving;
identifying a suitable subset of the plurality of instructions, wherein said suitable subset of the plurality of instructions occurs two or more times in the plurality of instructions;
configuring a specialized instruction unit which is operable to execute the suitable subset of the plurality of instructions, wherein said configuring comprises programming a programmable logic device to execute the suitable subset of the plurality of instructions, wherein said configuring is performed in response to said identifying; and
executing the plurality of instructions, wherein said executing includes the specialized instruction unit executing the suitable subset of the plurality of instructions, wherein said executing occurs one or more times the suitable subset of the plurality of instructions is ready for execution.

12. The method of claim 11, wherein the method is performed in a processing unit, wherein the processing unit includes a general processing core and the specialized instruction unit;
wherein the specialized instruction unit executes the repeating subset of the plurality of instructions faster than said general processing core would execute the repeating subset of the plurality of instructions.

13. The method of claim 11, wherein said examining occurs during an initialization procedure.

14. The method of claim 11, further comprising:
identifying a second repeating subset of the plurality of instructions;
preparing a second specialized instruction unit which is operable to execute the second repeating subset of the plurality of instructions, wherein said preparing comprises programming a second plurality of programmable logic elements with the second repeating subset of the plurality of instructions; and executing the second repeating subset of the plurality of instructions in the second specialized instruction unit, wherein said executing the second repeating subset occurs each time the second repeating subset of the plurality of instructions is ready for execution.

15. The method of claim 14, wherein said identifying a second repeating subset of the plurality of instructions occurs after said identifying a repeating subset of the plurality of instructions.

16. The method of claim 14, further comprising:

receiving a second plurality of instructions;

examining a second plurality of instructions;

identifying a new repeating subset of the second plurality of instructions;

comparing the new repeating subset of the second plurality of instructions with the repeating subset of the plurality of instructions and the second repeating subset of the plurality of instructions;

deciding on a preferred subset ranking among the repeating subset of the plurality of instructions, the second repeating subset of the plurality of instructions, and the new repeating subset of the second plurality of instructions to pick a preferred subset; and reprogramming one of the specialized instruction units with the preferred subset if the preferred subset is the new repeating subset of the second plurality of instructions.

17. The method of claim 11, wherein said repeating subset of the plurality of instructions includes one or more external instructions, wherein the one or more external instructions are only executable with latency.

18. The method of claim 11, wherein the plurality of programmable logic elements are selected from the group consisting of: programmable array logics (PALs), programmable logic devices (PLDs), field programmable gate arrays (FPGAs), and dynamically reconfigurable logics (DRL), and dynamically reconfigurable hardware (DRHW).

19. A computer processor, the computer processor comprising:

a decode unit operable to decode instructions;

a plurality of registers coupled to the decode unit, wherein the plurality of registers are operable to store one or more of the group consisting of: the instructions, memory addresses, values and results;

a load/store unit coupled to the decode unit, wherein the load/store unit is operable to load the values from memory locations, wherein the load/store unit is further operable to store the values to the memory locations;

a branch execute unit coupled to the decode unit, wherein the branch execute unit is operable to execute branch instructions;

one or more arithmetic/logic units coupled to the decode unit, wherein the one or more arithmetic/logic units is operable to execute arithmetic and logic instructions;

one or more specialized instruction units coupled to the decode unit, wherein the one or more specialized instruction units are programmable to execute a select sequence of a plurality of instructions;

a library for storing various configurations for the one or more specialized instruction units, wherein the decode unit is configured to select a configuration from the library to configure the one or more specialized instruction units;

a writeback unit coupled to the plurality of registers, wherein the writeback unit is operable to update the plurality of registers responsive to execution results from at least the one or more arithmetic/logic units.

20. The computer processor of claim 19, further comprising:

one or more floating point units coupled to the decode unit, wherein the one or more floating point units are operable to execute floating point instructions.

21. The computer processor of claim 19, wherein the one or more specialized instruction units execute the select sequence of a plurality of instructions at a faster rate than at least the one or more arithmetic/logic units.

22. The computer processor of claim 19, wherein the select sequence of a plurality of instructions executable by the one or more specialized instruction units is selected from the group consisting of: only integer instructions; only floating point instructions; only multimedia instructions; and a combination of the integer instructions and the floating point instructions; a mixture of the floating point instructions and the multimedia instructions; and instructions external to the computer processor.

23. A method of configuring a specialized instruction unit, the method comprising:

receiving a configuration signal to configure the specialized instruction unit to execute one or more instructions;

selecting a configuration for the specialized instruction unit in response to said receiving a configuration signal to configure the specialized instruction unit to execute one or more instructions; and configuring a specialized instruction unit which is operable to execute the one or more instructions, wherein said configuring comprises programming a programmable logic device to execute the one ore more instructions, wherein said configuring is performed in response to said selecting.

* * * * *